United States Patent
Lee et al.

(10) Patent No.: US 12,176,584 B2
(45) Date of Patent: Dec. 24, 2024

(54) GAS DIFFUSION LAYER FOR FUEL CELL, METHOD OF MANUFACTURING THE SAME, AND UNIT CELL FOR FUEL CELL INCLUDING THE SAME

(71) Applicants: Hyundai Motor Company, Seoul (KR); Kia Corporation, Seoul (KR)

(72) Inventors: Ji Han Lee, Seongnam-si (KR); Jae Man Park, Yongin-si (KR); Seung Tak Noh, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/461,356

(22) Filed: Sep. 5, 2023

(65) Prior Publication Data

US 2023/0420699 A1 Dec. 28, 2023

Related U.S. Application Data

(62) Division of application No. 17/346,481, filed on Jun. 14, 2021, now abandoned.

(30) Foreign Application Priority Data

Dec. 22, 2020 (KR) ........................ 10-2020-0181244

(51) Int. Cl.
*H01M 8/02* (2016.01)
*H01M 8/0234* (2016.01)
(Continued)

(52) U.S. Cl.
CPC ....... *H01M 8/0234* (2013.01); *H01M 8/0245* (2013.01); *H01M 8/1004* (2013.01)

(58) Field of Classification Search
CPC ............. H01M 8/0234; H01M 8/0245; H01M 8/1004; H01M 8/0254; H01M 8/0258; H01M 4/8807; Y02E 60/50
See application file for complete search history.

(56) References Cited

U.S. PATENT DOCUMENTS

| 7,150,934 B2 * | 12/2006 | Yoshida | H01M 8/1004 429/511 |
| 9,692,070 B2 | 6/2017 | Lee et al. | |

(Continued)

FOREIGN PATENT DOCUMENTS

| JP | 2004-185911 | * 7/2004 | ............. H01M 4/96 |
| JP | 2017182900 A | 10/2017 | |

(Continued)

OTHER PUBLICATIONS

JP 2004-185911 machine English translation (Year: 2004).*

*Primary Examiner* — Michael L Dignan
(74) *Attorney, Agent, or Firm* — SLATER MATSIL, LLP (57) ABSTRACT

One embodiment provides a gas diffusion layer for a fuel cell constituting a unit cell of the fuel cell. The gas diffusion layer includes a base layer that includes short carbon fibers and has a reinforcing portion formed in a predetermined area thereof in a thickness direction with continuous carbon fibers oriented in the reinforcing portion. The reinforcing portion is formed adjacent to a first surface of the base layer. A micro porous layer is formed on the first surface of the base layer.

8 Claims, 9 Drawing Sheets

(51) Int. Cl.
H01M 8/0245 (2016.01)
H01M 8/1004 (2016.01)

(56) References Cited

U.S. PATENT DOCUMENTS

| | | |
|---|---|---|
| 2011/0136044 A1 | 6/2011 | Han et al. |
| 2018/0162092 A1 | 6/2018 | Tsotsis et al. |
| 2018/0175393 A1* | 6/2018 | Park .................... H01M 8/0245 |
| 2022/0021007 A1* | 1/2022 | Lee ..................... H01M 8/0241 |

FOREIGN PATENT DOCUMENTS

| | | |
|---|---|---|
| JP | 2018126995 A | 8/2018 |
| WO | 2020116877 A1 | 6/2020 |

* cited by examiner

FIG. 1

-PRIOR ART-

GAS DIFFUSION LAYER FOR FUEL CELL, METHOD OF MANUFACTURING THE SAME, AND UNIT CELL FOR FUEL CELL INCLUDING THE SAME

CROSS-REFERENCE TO RELATED APPLICATIONS

This application is a division of U.S. application Ser. No. 17/346,481, filed on Jun. 14, 2021, which claims the benefit of Korean Patent Application No. 10-2020-0181244, filed on Dec. 22, 2020, which applications are hereby incorporated herein by reference.

TECHNICAL FIELD

The present disclosure relates to a gas diffusion layer for a fuel cell, a method of manufacturing the same, and a unit cell for a fuel cell including the same.

BACKGROUND

A fuel cell, which is a kind of power generation device electrochemically reacting chemical energy of fuel in a stack to convert the chemical energy into electrical energy, can be used for industrial and household purposes, and used to not only supply power for driving a vehicle but also supply power to a small electronic product such as a portable device. Recently, the applicable fields of the fuel cell have increasingly expanded because the fuel cell is a highly efficient clean energy source.

Figure 1:
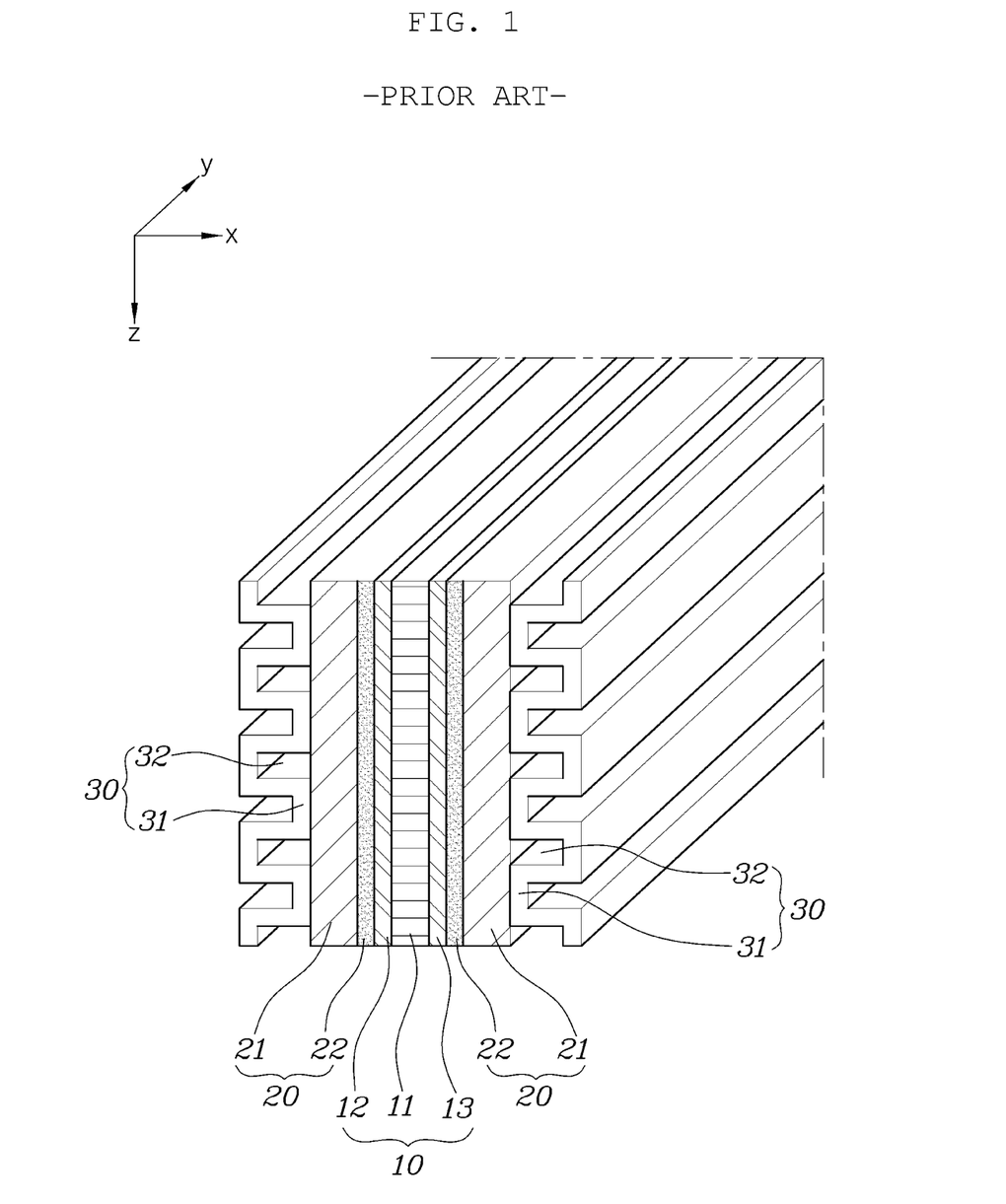
FIG. 1 is a view showing a typical unit cell for a fuel cell.

FIG. 1 is a view showing a typical unit cell for a fuel cell.

As can be seen from FIG. 1, a membrane-electrode assembly (MEA) 10 is located on the innermost area of the typical unit cell for a fuel cell. The membrane-electrode assembly 10 includes a polymer electrolyte membrane ii capable of moving hydrogen cations (protons), and catalyst layers coated on both surfaces of the electrolyte membrane for hydrogen and oxygen to react, that is, an anode electrode layer (anode) 12 and a cathode electrode layer (cathode) 13.

In addition, gas diffusion layers (GDLs) 20 are stacked on outer sides of the membrane-electrode assembly 10, that is, on respective outer sides of the anode electrode layer 12 and the cathode electrode layer 13, and separators 30, each having a flow field formed to supply fuel and discharge water generated by the reaction, are located on respective outer sides of the gas diffusion layers 20.

The separator 30 is a flow field type separator. The flow field type separator is bent so that lands 31 and channels 32 are alternately formed, the lands 31 are supported by the gas diffusion layer 20, and reaction gas flows through the channels 32. In this case, the lands 31 and the channels 32 are formed to be aligned in one direction along a reaction gas flow direction.

Meanwhile, the gas diffusion layer 20 is formed by forming a micro porous layer (MPL) 22 on a base layer 21 made of carbon fibers.

In this case, the base layer 21 is generally formed by impregnating a carbon fiber paper with a hydrophobic agent such as polytetrafluoroethylene (PTFE). As an example of the carbon fiber paper, carbon paper, carbon cloth, or the like may be used.

In addition, the micro porous layer 22 may be manufactured by mixing a hydrophobic agent such as PTFE with carbon powder such as carbon black, acetylene black carbon, or black pearls carbon, and then coated on one surface or both surfaces of the base layer 21 according to the purpose of use.

Meanwhile, the carbon fiber base of the base layer 21 is formed in a paper type by forming a paper from short carbon fibers dispersed in an aqueous solution on a conveyor belt. As a result, the short carbon fibers are randomly oriented in a two-dimensional (2D) direction. Subsequently, a binder is heat-treated, the carbon fiber paper is impregnated with a hydrophobic agent, and the carbon fiber paper is carbonized to form the base layer.

However, when the base layer is manufactured by a roll to roll process according to a conventional method, there has been a problem that the base layer is easily fractured by a small impact or depending on roll driving conditions. The fracture of the base layer causes a problem that the production process yield and product quality deteriorate.

In particular, when a gas diffusion layer is formed as a thin film according to the demand for making a fuel cell in a small size, the fracture problem of the base layer has occurred more easily. For this reason, it has been difficult to secure mass productivity in manufacturing the gas diffusion layer to have a thickness of 150 µm or less.

The contents described as the related art have been provided only to assist in understanding the background of the present disclosure and should not be considered as corresponding to the related art known to those having ordinary skill in the art.

SUMMARY

The present disclosure relates to a gas diffusion layer for a fuel cell, a method of manufacturing the same, and a unit cell for a fuel cell including the same. Particular embodiments relate to a gas diffusion layer for a fuel cell having a continuous reinforcing portion, a method of manufacturing the same, and a unit cell for a fuel cell including the same.

An embodiment of the present disclosure provides a gas diffusion layer for a fuel cell having a continuous reinforcing portion, a method of manufacturing the same, and a unit cell for a fuel cell including the same.

According to an embodiment of the present disclosure, a gas diffusion layer for a fuel cell constituting a unit cell of the fuel cell includes a base layer including short carbon fibers and having a reinforcing portion formed in a predetermined area thereof in a thickness direction with continuous carbon fibers oriented in the reinforcing portion.

The continuous carbon fibers of the reinforcing portion formed in the base layer may be oriented in one direction along a plane perpendicular to the thickness direction, while being spaced apart from each other.

Each of the continuous carbon fibers of the reinforcing portion may have a diameter of 6 to 12 µm.

The continuous carbon fibers of the reinforcing portion may be formed in bundles, each including a plurality of continuous carbon fibers, and each of the bundles of continuous carbon fibers may have a thickness of 50% or less of a total thickness of the base layer.

Each of the bundles of continuous carbon fibers in the reinforcing portion may be spaced apart from an adjacent bundle of continuous carbon fibers at a distance of 2 to 20 mm.

The reinforcing portion may be formed adjacent to a surface of the base layer.

The gas diffusion layer may further include a micro porous layer formed on one surface of the base layer, and the reinforcing portion may be formed adjacent to a surface opposite to the surface on which the micro porous layer is formed.

The gas diffusion layer may further include a micro porous layer formed on one surface of the base layer, and the reinforcing portion may be formed adjacent to the surface on which the micro porous layer is formed.

According to another embodiment of the present disclosure, a method of manufacturing a gas diffusion layer for a fuel cell constituting a unit cell of the fuel cell includes preparing a mixed dispersion in which short carbon fibers are mixed, orienting continuous carbon fibers on a conveyor belt, forming a paper having a reinforcing portion in which the continuous carbon fibers are oriented by supplying the prepared mixed dispersion to the conveyor belt on which the continuous carbon fibers are oriented, and forming a base layer by impregnating the paper with a hydrophobic agent.

In the orienting of the continuous carbon fibers, the continuous carbon fibers may be oriented in one direction, while being spaced apart from each other.

In the orienting of the continuous carbon fibers, the continuous carbon fibers may be prepared in bundles, each including a plurality of continuous carbon fibers, and the bundles of continuous carbon fibers may be oriented in close contact with or adjacent to a surface of the conveyor belt. In the forming of the paper, the mixed dispersion may be supplied to the surface of the conveyor belt at a thickness greater than that of each of the bundles of continuous carbon fibers.

In the forming of the paper, the mixed dispersion may be supplied at a thickness at least two times greater than that of each of the bundles of continuous carbon fibers.

In the orienting of the continuous carbon fibers, each of the continuous carbon fibers forming the bundles may have a diameter of 6 to 12 μm, and each of the bundles of continuous carbon fibers may be spaced apart from an adjacent bundle of continuous carbon fibers at a distance of 2 to 20 mm.

The method may further include, after the forming of the base layer, forming a micro porous layer by applying a slurry in which a hydrophobic agent is mixed with carbon-based powder onto one surface of the base layer. In the forming of the micro porous layer, the slurry may be applied onto a surface opposite to a surface of the base layer on which the reinforcing portion is formed.

The method may further include, after the forming of the base layer, forming a micro porous layer by applying a slurry in which a hydrophobic agent is mixed with carbon-based powder onto one surface of the base layer. In the forming of the micro porous layer, the slurry may be applied onto a surface of the base layer on which the reinforcing portion is formed.

According to another embodiment of the present disclosure, a unit cell for a fuel cell includes a membrane-electrode assembly (MEA), a pair of gas diffusion layers (GDLs) disposed on both surfaces of the membrane-electrode assembly, respectively, and a pair of flow field type separators disposed on respective outer sides of the gas diffusion layers and bent so that lands and channels are alternately formed, wherein each of the gas diffusion layers includes a base layer including short carbon fibers and having a reinforcing portion formed in a predetermined area thereof in a thickness direction with continuous carbon fibers oriented in the reinforcing portion.

The continuous carbon fibers of the reinforcing portion formed in the base layer of the gas diffusion layer may be oriented in one direction, while being spaced apart from each other.

The lands and the channels formed in the separator may be formed to be aligned in one direction, and a direction in which the continuous carbon fibers of the reinforcing portion are oriented may be kept at an angle of 45 to 90° with respect to a direction in which the lands and channels of the separator are formed.

The base layer of the gas diffusion layer may be disposed to face the separator, the gas diffusion layer may further include a micro porous layer formed on one of both surfaces of the base layer facing the membrane-electrode assembly (MEA), and the reinforcing portion of the gas diffusion layer may be formed adjacent to the other one of both surfaces of the base layer facing the separator.

The base layer of the gas diffusion layer may be disposed to face the separator, the gas diffusion layer may further include a micro porous layer formed on one of both surfaces of the base layer facing the membrane-electrode assembly (MEA), and the reinforcing portion of the gas diffusion layer is formed adjacent to the one of both surfaces of the base layer facing the micro porous layer.

BRIEF DESCRIPTION OF THE DRAWINGS

FIGS. 6A to 8B are views for comparing the unit cell for a fuel cell according to an embodiment of the present disclosure with the typical unit cell for a fuel cell.

DETAILED DESCRIPTION OF ILLUSTRATIVE EMBODIMENTS

Hereinafter, embodiments of the present disclosure will be described in more detail with reference to the accompanying drawings. However, the present disclosure is not limited to the embodiments to be described below and may be implemented in variously different forms. The embodiments are provided to complete the present disclosure and for those skilled in the art to completely understand the scope of the present disclosure. In the drawings, like reference numerals denote like components.

Figure 2:
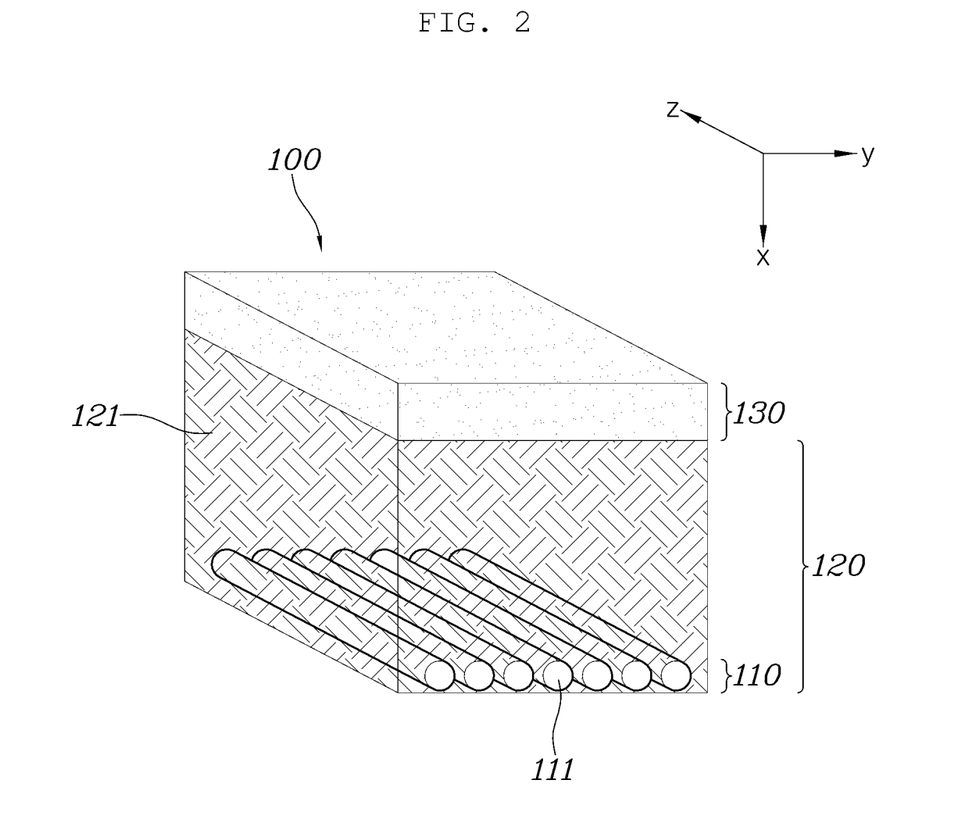
FIGS. 2 and 3 are views showing a gas diffusion layer for a fuel cell according to an embodiment of the present disclosure.
Figure 3:
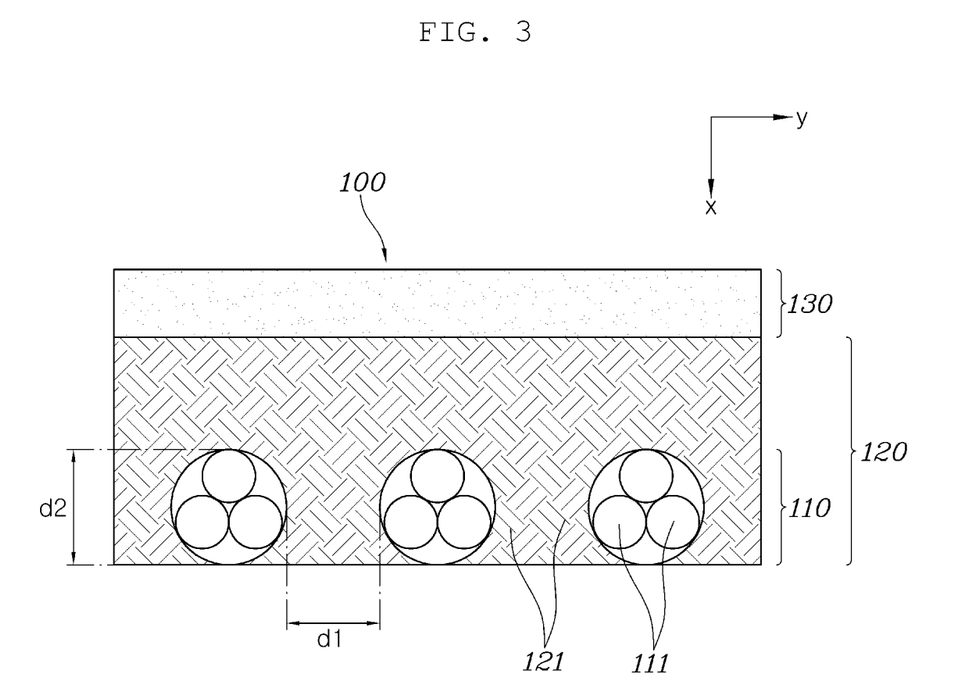

FIGS. 2 and 3 are views showing a gas diffusion layer for a fuel cell according to an embodiment of the present disclosure.

As illustrated in FIGS. 2 and 3, a gas diffusion layer 100 for a fuel cell according to an embodiment of the present disclosure includes a base layer 120 including short carbon fibers 121 and having a reinforcing portion no formed in a predetermined area thereof in a thickness direction (x-axis direction) with continuous carbon fibers 111 oriented in the reinforcing portion 110, and a micro porous layer 130 formed on one surface of the base layer 120.

In this case, the micro porous layer 130 is formed to be identical or similar to a general micro porous layer applied to a typical gas diffusion layer. For example, the micro porous layer 130 is formed by applying a slurry, in which a hydrophobic agent such as polytetrafluoroethylene (PTFE) is mixed with carbon-based powder such as carbon black, onto one surface of the base layer 120. Then, the micro porous layer 130 is formed in such a manner that some of the slurry applied remains on one surface of the base layer 120 and the other of the slurry applied permeates into the surface of the base layer 120 by a predetermined depth. The micro porous layer 130 is not limited to the above-described embodiment, and may be modified in various manners as long as micro pores are formed to allow reaction gas to flow while being diffused therethrough.

Meanwhile, the base layer 120 is similar to a general base layer manufactured by impregnating a base in the form of carbon fiber paper or the like made of short carbon fibers 121 with a hydrophobic agent such as PTFE for imparting hydrophobicity, but the reinforcing portion no is formed in the predetermined area of the base layer 120 in the thickness direction (x-axis direction) with the continuous carbon fibers 111 oriented therein.

The continuous carbon fibers 111 constituting the reinforcing portion 110 formed in the base layer 120 are preferably oriented in one direction, while being spaced apart from each other, so that tensile properties of the continuous fibers are exhibited.

In this case, it is preferable that the direction in which the continuous carbon fibers 111 are oriented is variously modified depending on structures of the lands 31 and the channels 32 formed in the separator 30. For example, the direction in which the continuous carbon fibers 111 are oriented in the reinforcing portion 110 is preferably kept at an angle of 45 to 90° with respect to a direction (y-axis direction) in which the lands 31 and the channels 32 of the separator 30 are formed. Thus, the continuous carbon fibers 111 may be oriented in the reinforcing portion no in various directions, on a plane (y-z plane) perpendicular to the thickness direction (x-axis direction), depending on the structures of the lands 31 and the channels 32 of the separator 30.

In addition, each of the continuous carbon fibers 111 forming the reinforcing portion 110 preferably has a diameter of 6 to 12 μm. It is preferable to maintain the diameter of the continuous carbon fiber in within the proposed range for smooth diffusion and flow of reaction gas and generated water passing through the base layer 120. In particular, it is more preferable that the continuous carbon fiber in has a smaller diameter within the proposed range. However, if the diameter of the continuous carbon fiber 111 is smaller than 6 μm, a desired level of tensile properties is not achieved.

In addition, the continuous carbon fibers 111 in the reinforcing portion 110 are most preferably used as single strands, but may be formed and used in bundles, each including a plurality of continuous carbon fibers 111, to express the tensile properties of the continuous carbon fibers 111 at a desired level. In this case, each of the bundles of continuous carbon fibers in preferably has a thickness d2 of 50% or less of a total thickness of the base layer 120.

In addition, each of the bundles of continuous carbon fibers 111 in the reinforcing portion no is preferably kept spaced apart from an adjacent bundle of continuous carbon fibers 111 at a distance d1 of 2 to 20 mm. If the distance d1 between the bundles of continuous carbon fibers 111, which are spaced apart from each other, is smaller than 2 mm, the continuous carbon fibers 111 are of high density, resulting in an increase in flow resistance of the reaction gas and generated water. If the distance d1 between the bundles of continuous carbon fibers 111, which are spaced apart from each other, is greater than 20 mm, a mechanical stiffness increasing effect of the reinforcing portion 110 is insignificant.

Meanwhile, as illustrated in FIG. 3, the reinforcing portion 110 is preferably formed adjacent to a surface of the base layer 120.

In this case, the reinforcing portion 110 is preferably formed adjacent to one of both surfaces of the base layer 120 opposite to the other one of both surfaces of the base layer 120 on which the micro porous layer 130 is formed. When forming a fuel cell stack, since the reinforcing portion 110 of the base layer 120 faces the separator 30, the base layer 120 reinforced by the reinforcing portion no may be suppressed from intrusion into the channels of the separator 30.

On the other hand, the location at which the reinforcing portion is formed in the base layer may be changed.

Figure 4:
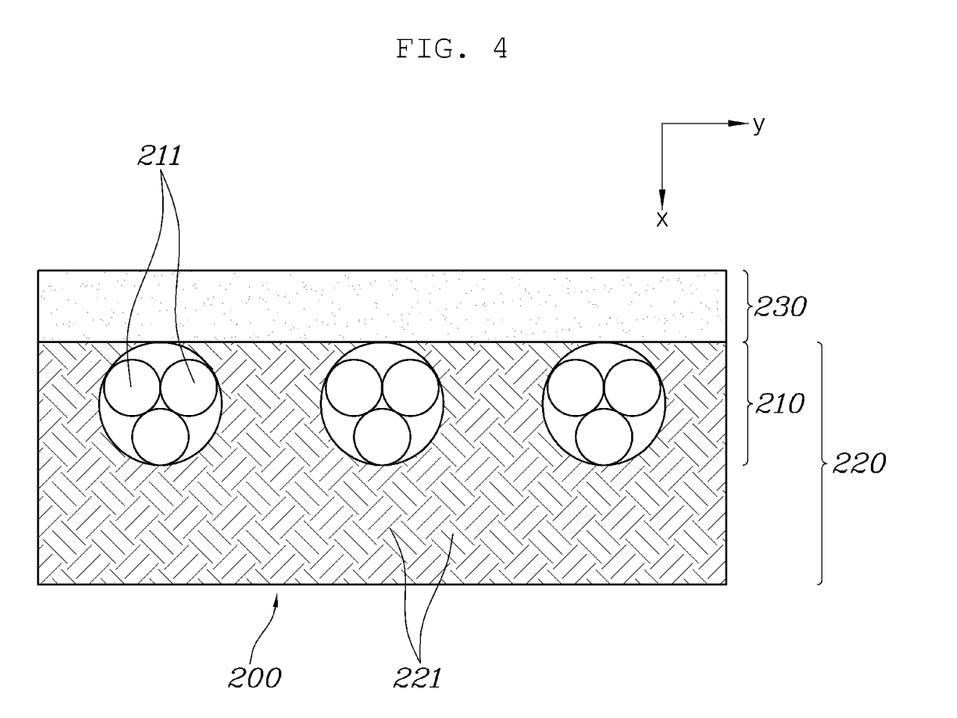
FIG. 4 is a view showing a gas diffusion layer for a fuel cell according to another embodiment of the present disclosure.

FIG. 4 is a view showing a gas diffusion layer for a fuel cell according to another embodiment of the present disclosure.

As illustrated in FIG. 4, like the gas diffusion layer in the above-described embodiment, a gas diffusion layer 200 includes a base layer 220 including short carbon fibers 221 and having a reinforcing portion 210 formed in a predetermined area thereof in a thickness direction (x-axis direction) with continuous carbon fibers 211 in the reinforcing portion 210, and a micro porous layer 230 formed on one surface of the base layer 220.

However, concerning the reinforcing portion 210 formed adjacent to a surface of the base layer 220, in this case, the reinforcing portion 210 is formed adjacent to one of both surfaces of the base layer 220 on which the micro porous layer 230 is formed. Accordingly, when the gas diffusion layer 200 is manufactured, the micro porous layer 230 can be formed relatively uniformly, and it is possible to reduce damage to a membrane-electrode assembly (MEA) caused by ends of the short carbon fibers 221 forming the base layer 220. In addition, a pore gradient is formed sequentially in a direction from the micro porous layer 230 through the reinforcing portion 210 and the base layer 220 to the separator 30, thereby smoothly discharging the generated water and supplying the reaction gas.

Next, a unit cell to which the gas diffusion layer according to embodiments of the present disclosure is applied will be described.

Like a typical unit cell for a fuel cell, the unit cell for a fuel cell to which the gas diffusion layer 100 having the reinforcing portion no formed therein is applied includes a membrane-electrode assembly 10; a pair of gas diffusion layers 100 disposed on both surfaces of the membrane-electrode assembly 10, respectively; and a pair of flow field type separators 30 disposed on respective outer sides of the gas diffusion layers 100 and bent so that lands 31 and channels 32 are alternately formed.

In this case, as proposed in the above-described embodiment, the gas diffusion layer 100 includes a base layer 120 including short carbon fibers 121 and having a reinforcing portion 110 formed in a predetermined area thereof in a thickness direction (x-axis direction) with continuous carbon fibers 111 oriented in the reinforcing portion no, and a micro porous layer 130 formed by impregnating a surface of the base layer 120 with a slurry in which a hydrophobic agent is mixed with carbon-based powder.

As the separator 30, a flow field type separator is applied. For example, the separator 30 is bent so that the lands 31 and the channels 32 are alternately formed, the lands 31 are supported by the gas diffusion layer 100, and reaction gas flows through the channels 32. In this case, the lands 31 and the channels 32 are formed to be aligned in one direction along a reaction gas flow direction.

In this case, a direction in which the continuous carbon fibers 111 of the reinforcing portion 110 are oriented is preferably kept at an angle of 45 to 90° with respect to a direction (y-axis direction) in which the lands 31 and the channels 32 of the separator 30 are formed. When forming a fuel cell stack, since the continuous carbon fibers 111 of the reinforcing portion 110 are disposed to cross the channels 32 of the separator 30, the base layer 120 may be suppressed from intrusion into the channels 32 of the separator 30.

If the angle between the direction in which the continuous carbon fibers 111 of the reinforcing portion 110 are oriented and the direction in which the lands 31 and the channels 32 of the separator 30 are formed is smaller than 45°, the channels 32 of the separator 30 may be disposed to be aligned with the direction in which the continuous carbon fibers 111 are oriented, thereby causing a problem that the continuous carbon fibers 111 intrude into the channels 32 of the separator 30.

In addition, it is preferable that the base layer 120 of the gas diffusion layer 100 is disposed to face the separator 30, and the reinforcing portion 110 of the gas diffusion layer 100 is formed adjacent to one of both surfaces of the base layer 120 facing the separator 30. Since the base layer 120 is reinforced by the reinforcing portion 110, the base layer 120 can be suppressed from intrusion into the channels 32 of the separator 30.

Also, as in the above-described gas diffusion layer 200 according to another embodiment, the base layer 220 of the gas diffusion layer 200 may be disposed to face the separator 30, and the reinforcing portion 210 of the gas diffusion layer 200 may be formed adjacent to one of both surfaces of the base layer 120 facing the micro porous layer 230. Accordingly, a pore gradient may be formed sequentially in the direction from the micro porous layer 230 through the reinforcing portion 210 and the base layer 220 to the separator 30.

Next, a method of manufacturing the above-described gas diffusion layer will be described.

Figure 5:
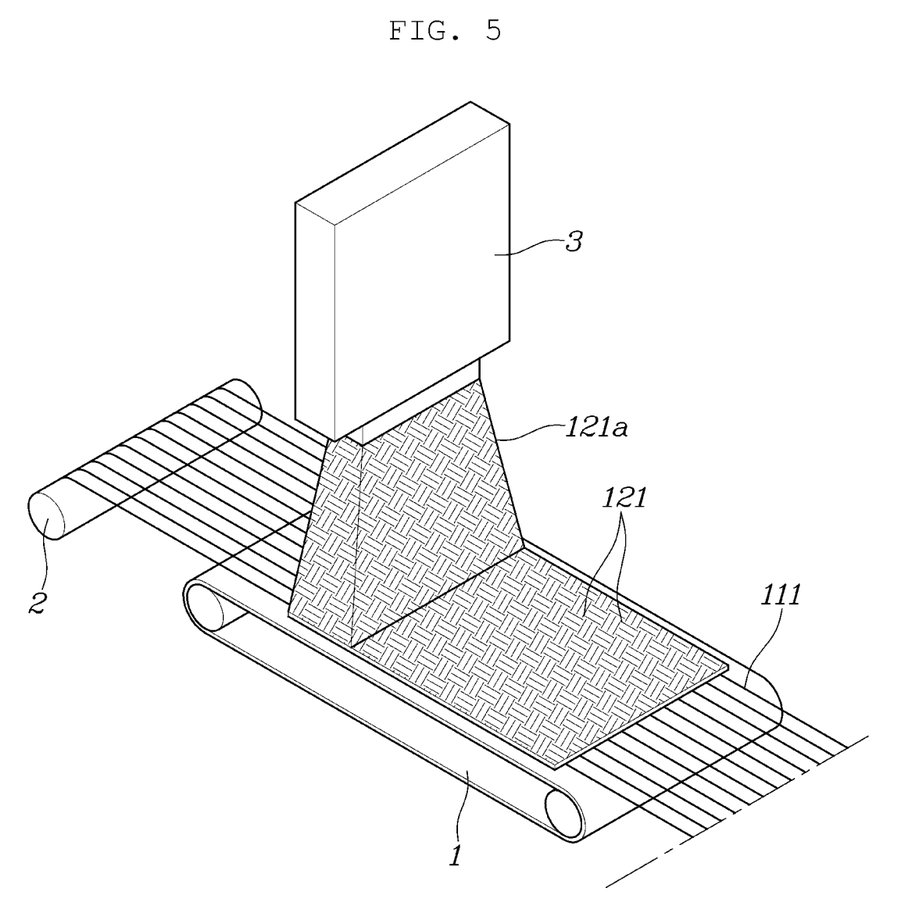
FIG. 5 is a view for explaining a process of manufacturing the gas diffusion layer for a fuel cell according to an embodiment of the present disclosure.

FIG. 5 is a view for explaining a process of manufacturing the gas diffusion layer for a fuel cell according to an embodiment of the present disclosure.

A method of manufacturing a gas diffusion layer according to an embodiment of the present disclosure includes preparing a mixed dispersion 121a in which short carbon fibers 121 are mixed, orienting continuous carbon fibers 111 on a conveyor belt 1, forming a paper having a reinforcing portion 110 in which the continuous carbon fibers 111 are oriented by supplying the prepared mixed dispersion 121a to the conveyor belt 1 on which the continuous carbon fibers 111 are oriented, forming a base layer 120 by impregnating the paper with a hydrophobic agent, and forming a micro porous layer 130 by applying a slurry in which a hydrophobic agent is mixed with carbon-based powder onto a surface of the base layer 120.

The preparing of the mixed dispersion is preparing a mixed dispersion 121a in which short carbon fibers 121 are dispersed to form a base layer 120. The mixed dispersion 121a is prepared by mixing short carbon fibers 121, a binder, and a dispersant in a solvent.

In this case, water may be used as the solvent, and PAN-based short carbon fibers each having a length of 6 mm or 12 mm are used as the short carbon fibers 121. Further, a PVA-based binder is used as the binder.

The mixed dispersion 121a prepared in this way is filled into a hopper 3 provided above the conveyor belt 1.

The orienting of the continuous carbon fibers 111 is orienting continuous carbon fibers 111 in one direction to manufacture a reinforcing portion no to be formed in the base layer 120. In this case, continuous carbon fibers 111 are unwound from a winding roll 2 around which the continuous carbon fibers 111 are wound, and the unwound continuous carbon fibers 111 are oriented in one direction in close contact with or adjacent to a surface of the conveyor belt 1 while being spaced apart from each other.

Here, the continuous carbon fibers 111 are most preferably oriented as single strands, but may be formed in bundles, each including a plurality of continuous carbon fibers 111, and supplied to the conveyor belt 1.

In this case, each of the continuous carbon fibers 111 forming the bundles has a diameter of 6 to 12 μm, and the continuous carbon fibers 111 are oriented so that each of the bundles of continuous carbon fibers 111 is spaced apart from an adjacent bundle of continuous carbon fibers 111 at a distance of 2 to 20 mm.

In forming of the paper, the mixed dispersion 121a is supplied from the hopper 3 provided above the conveyor belt 1 to the surface of the conveyor belt 1 on which the continuous carbon fibers 111 are oriented. In this case, the mixed dispersion 121a is preferably supplied at a thickness greater than that of each of the bundles of continuous carbon fibers 111. More preferably, the mixed dispersion 121a is supplied at a thickness at least two times greater than that of each of the bundles of continuous carbon fibers 111.

After supplying the mixed dispersion 121a, in which the short carbon fibers 121 are mixed, to the continuous carbon fibers 111 as described above, the mixed dispersion 121a is dried so that the short carbon fibers 121 and the continuous carbon fibers 111 are bound to each other, while the short carbon fibers 121 mixed in the mixed dispersion 121a are primarily bound together, thereby forming the paper. The formed paper may be cut to a desired size.

The forming of the base layer 120 is forming a base layer 120 in which the reinforcing portion no is formed. In forming of the base layer 120, first of all, the paper, that is, a carbon fiber web, is impregnated with a resin in which an inorganic filler is mixed, such that the short carbon fibers 121 mixed therein are secondarily bound together. Thereafter, the paper is carbonized through heat treatment at a temperature of about 1200 to 1400° C. Subsequently, in order to increase carbon crystallinity of carbon components constituting the paper, the carbon components are graphitized by additionally heat-treating the paper at a temperature of 2000 to 2400° C.

The paper graphitized in this way is impregnated with a hydrophobic agent such as PTFE.

Thereafter, heat treatment is performed at a temperature corresponding to a melting point or higher of PTFE, e.g. about 350° C., to activate PTFE, thereby forming a base layer with water repellency imparted to the paper.

The forming of the micro porous layer 130 is forming a micro porous layer 130 by applying a slurry in which a hydrophobic agent is mixed with carbon-based powder onto a surface of the base layer 120. First, the slurry is prepared by mixing carbon-based powder such as carbon black and a hydrophobic agent such as PTFE in a solvent. The prepared slurry is applied onto the surface of the base layer 120, and then the slurry is dried to form a micro porous layer 130 on the surface of the base layer 120.

Thereafter, heat treatment is performed at a temperature corresponding to a melting point or higher of PTFE, e.g.

about 350° C., to activate PTFE, thereby imparting water repellency to the base layer 120 and the micro porous layer 130.

Meanwhile, in the forming of the micro porous layer 130, the slurry may be applied onto a surface opposite to the surface of the base layer 120 on which the reinforcing portion 110 is formed, or applied onto the surface of the base layer 120 on which the reinforcing portion no is formed.

Next, the unit cell for a fuel cell in which the reinforcement portion is formed in the base layer according to an embodiment of the present disclosure will be compared with the typical unit cell for a fuel cell in which no reinforcement portion is formed in the base layer.

Figure 6A:
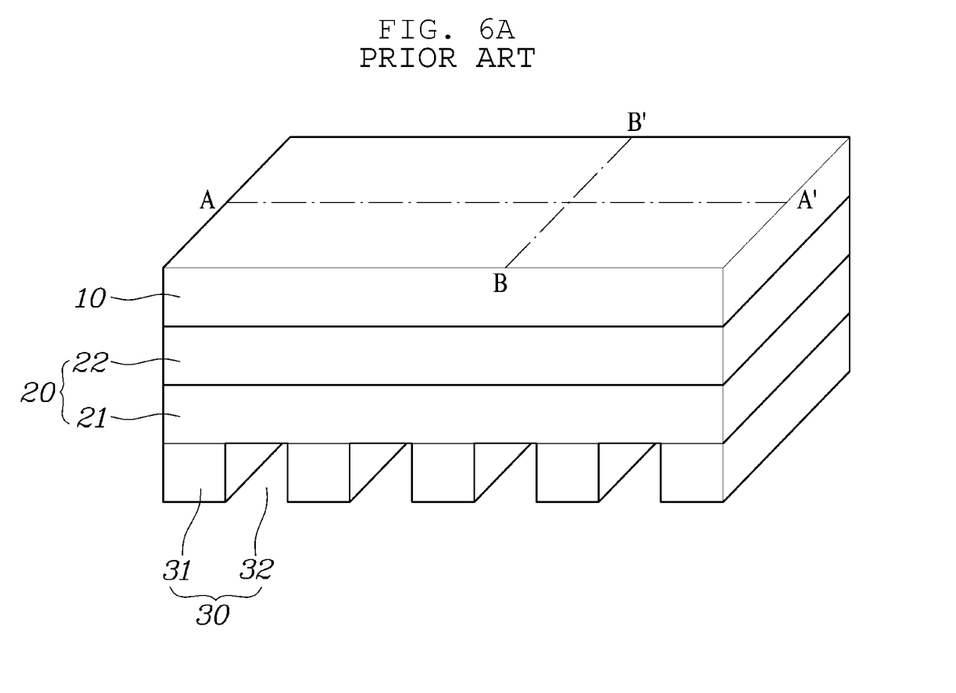
Figure 6B:
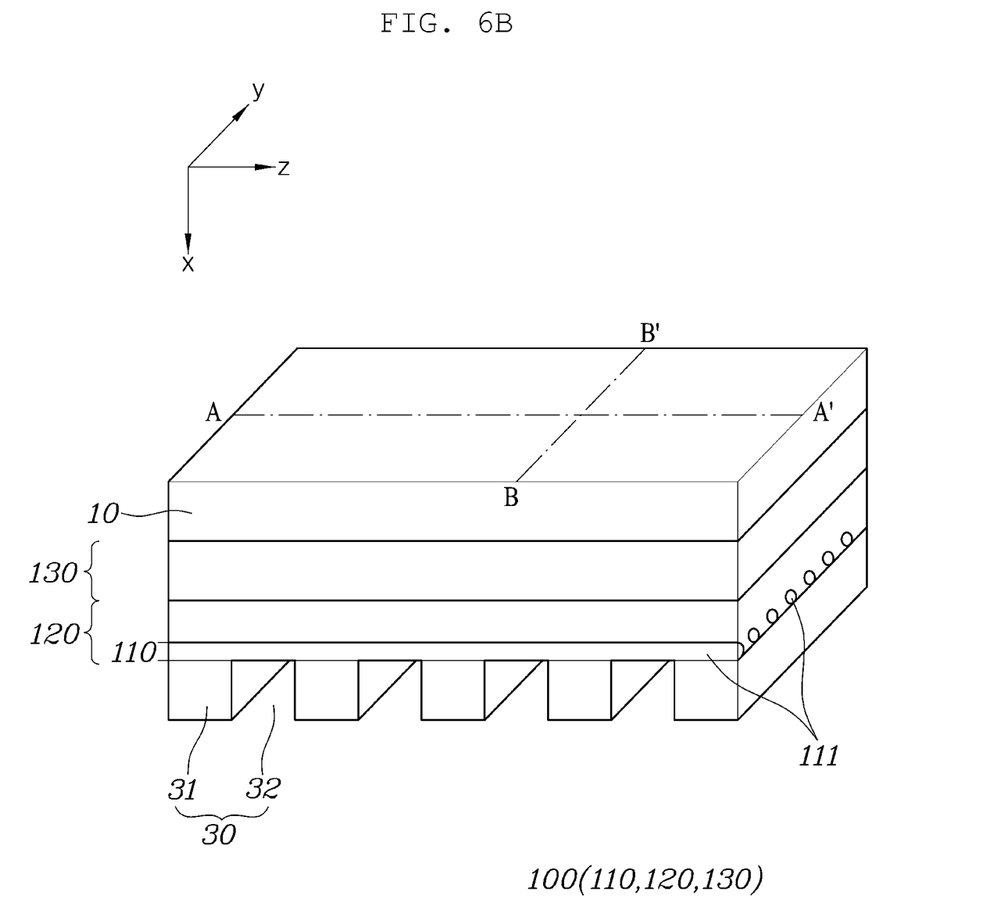
Figure 7A:
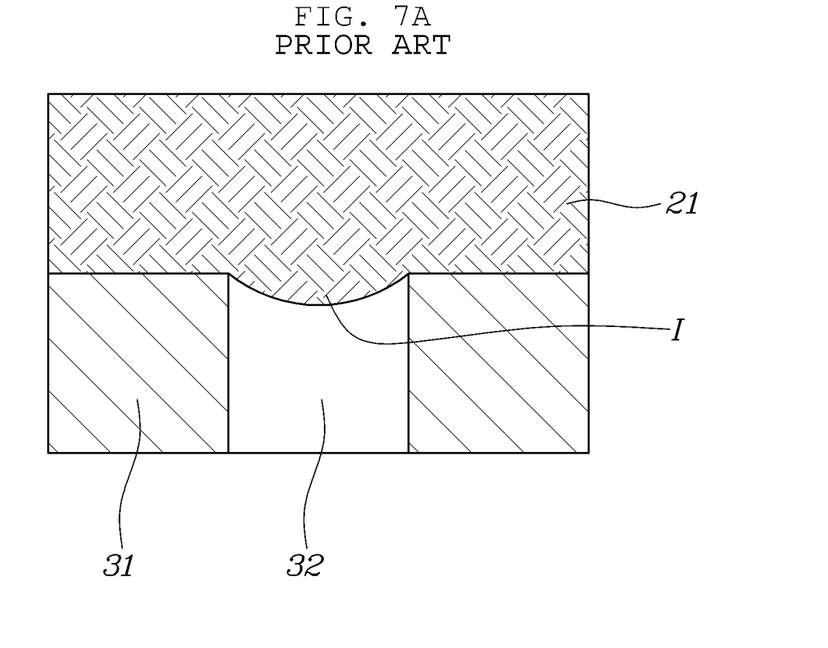
Figure 7B:
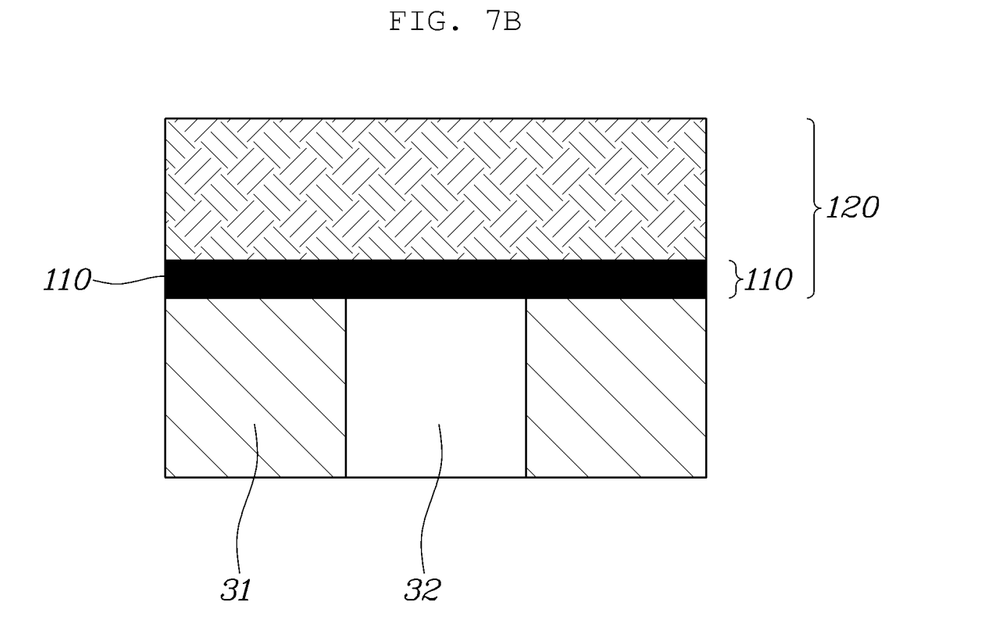
Figure 8A:
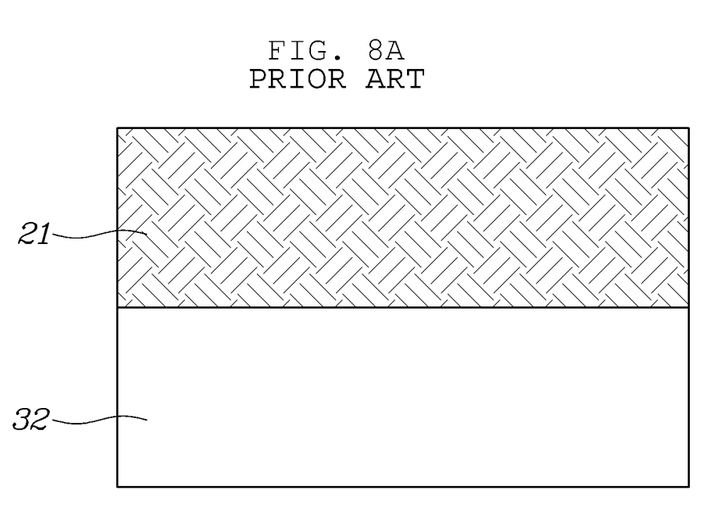
Figure 8B:
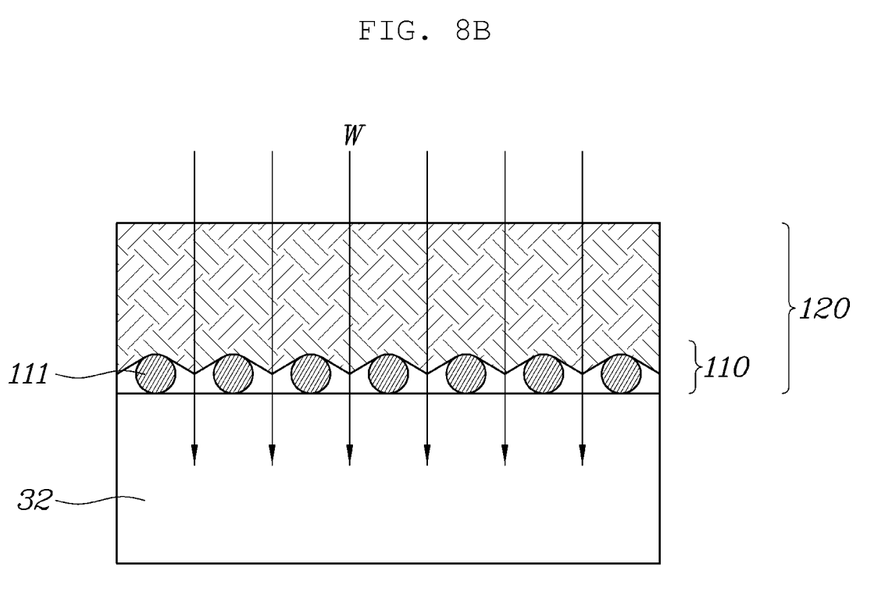

FIGS. 6A to 8B are views for comparing the unit cell for a fuel cell according to an embodiment of the present disclosure with the typical unit cell for a fuel cell. In this case, FIGS. 6A, 7A, and 8A are views showing the typical unit cell for a fuel cell in which no reinforcement portion is formed in the base layer, and FIGS. 6B, 7B, and 8B are views showing the unit cell for a fuel cell in which the reinforcement portion is formed in the base layer according to an embodiment of the present disclosure. In addition, FIGS. 7A and 7B show cross-sections cut along line A-A' of FIGS. 6A and 6B, respectively, and FIGS. 8A and 8B show cross-sections cut along line B-B' of FIGS. 6A and 6B, respectively.

As illustrated in FIG. 6B, the membrane-electrode assembly 10, the gas diffusion layer 100, and the separator 30 are sequentially stacked in the unit cell for a fuel cell. In this case, the base layer 120 forming the gas diffusion layer 100 faces the separator 30, and the micro porous layer 130 faces the membrane-electrode assembly 10. In addition, as the separator 30, a flow field type separator in which lands 31 and channels 32 are formed is applied.

In particular, in the gas diffusion layer 100 of the unit cell for a fuel cell according to an embodiment of the present disclosure, as illustrated in FIG. 6B, the reinforcing portion 110 including the continuous carbon fibers 111 oriented in one direction is disposed adjacent to a surface of the base layer 120 facing the separator 30.

In the unit cell for a fuel cell according to an embodiment of the present disclosure, the gas diffusion layer 100 and the separator 30 are stacked so that the direction in which the continuous carbon fibers 111 are oriented is kept at an angle of 90°, that is orthogonal, with respect to the direction (y-axis direction) in which the channels 32 of the separator 30 are formed.

As illustrated in FIG. 7A, in the typical unit cell for a fuel cell, while the gas diffusion layer 20 is stacked to face the separator 30, the base layer 21 partially intrudes into the channels of the separator 30 (I), resulting in a deformation of the gas diffusion layer 20. The deformation of the gas diffusion layer 20 causes a differential pressure between the channels 32, resulting in a problem that the performance of the fuel cell stack deteriorates.

On the other hand, as illustrated in FIG. 7B, in the unit cell for a fuel cell according to an embodiment of the present disclosure, while the gas diffusion layer 100 is stacked to face the separator 30, the reinforcing portion no formed in the base layer 120 of the gas diffusion layer 100 suppresses the base layer 120 from partially intruding into the channels 32 of the separator 30, thereby preventing a differential pressure between the channels 32.

In addition, as illustrated in FIG. 8A, in the typical unit cell for a fuel cell, when the base layer 21 of the gas diffusion layer 20 and the channels 32 of the separator 30 are in contact with each other, a separate water discharge passage for the generated water is not formed. In contrast, as illustrated in FIG. 8B, in the unit cell for a fuel cell according to an embodiment of the present disclosure, a passage for discharging the generated water W is formed in a space between the continuous carbon fibers 111 forming the reinforcing portion 110, which are spaced apart from each other. Thus, it is possible to expect an inducing effect for the generated water W to be smoothly discharged.

According to the embodiments of the present disclosure, the following effects can be expected.

First, due to the tensile properties of the continuous carbon fibers applied to the reinforcing portion, it is easy to produce a base in a roll type with excellent handling properties, thereby increasing a production yield in the gas diffusion layer manufacturing process and lowering a failure rate in the stack formation process. As a result, productivity can be increased and cost can be reduced.

Second, the reinforcing portion formed in the base layer increases a shear strength of the gas diffusion layer. Thus, even if the base layer for the gas diffusion layer is manufactured to have a thickness of 100 µm or less, no fracture occurs. Accordingly, mass productivity can be secured in manufacturing gas diffusion layers as thin-film in a roll to roll type.

Third, by stacking the gas diffusion layer and the separator so that the angle between the direction in which the continuous carbon fibers of the reinforcing portion formed in the base layer are oriented and the direction in which the lands and the channels of the flow field type separator are formed is kept within the range of 45 to 90°, when forming a fuel cell stack, the gas diffusion layer can be suppressed from intrusion into the channels of the separator, thereby reducing a differential pressure between the channels. As a result, the performance of the fuel cell stack can be improved.

Fourth, by stacking the gas diffusion layer and the separator so that the angle between the direction in which the continuous carbon fibers of the reinforcing portion formed in the base layer are oriented and the direction in which the lands and the channels of the flow field type separator are formed is kept within the range of 45 to 90°, a surface pressure against reaction formed in the channels of the separator can be increased, thereby reducing a contact resistance. As a result, the performance of the fuel cell stack can be improved.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A gas diffusion layer for a fuel cell constituting a unit cell of the fuel cell, the gas diffusion layer comprising:
    a base layer, comprising:
        short carbon fibers; and
        a reinforcing portion comprising a plurality of bundles of continuous carbon fibers embedded within the short carbon fibers of the base layer, wherein:
            the reinforcing portion is formed in a predetermined area of the base layer in a thickness direction,
            the reinforcing portion is formed adjacent to a first surface of the base layer, and
            the plurality of bundles of continuous carbon fibers embedded within the short carbon fibers of the base layer are spaced apart from one another at a distance of 2 to 20 mm; and a micro porous layer formed on the first surface of the base layer.

2. The gas diffusion layer of claim 1, wherein the continuous carbon fibers of the plurality of bundles of the reinforcing portion formed in the base layer are oriented in one direction along a plane perpendicular to the thickness direction.

3. The gas diffusion layer of claim 1, wherein each of the continuous carbon fibers of the reinforcing portion has a diameter of 6 to 12 μm.

4. The gas diffusion layer of claim 1, wherein each of the bundles of the plurality of bundles of continuous carbon fibers has a thickness of 50% or less of a total thickness of the base layer.

5. A unit cell for a fuel cell, the unit cell comprising:
a membrane-electrode assembly;
a pair of gas diffusion layers disposed on outer surfaces of the membrane-electrode assembly, respectively, wherein each of the gas diffusion layers includes a base layer comprising:
short carbon fibers; and
a reinforcing portion comprising a plurality of bundles of continuous carbon fibers embedded within the short carbon fibers of the base layer, wherein:
the reinforcing portion is formed in a predetermined area of the base layer in a thickness direction,
the reinforcing portion is formed adjacent to a first surface of the base layer, and
the plurality of bundles of continuous carbon fibers embedded within the short carbon fibers of the base layer are spaced apart from one another at a distance of 2 to 20 mm; and
a pair of flow field type separators disposed on outer sides of the gas diffusion layers, respectively, and bent so that lands and channels are alternately formed;
wherein:
the base layers of the gas diffusion layers are disposed to face the flow field type separators; and
the gas diffusion layers further include a micro porous layer formed on the first surface of the base layers facing the membrane-electrode assembly.

6. The unit cell of claim 5, wherein the continuous carbon fibers of the plurality of bundles of the reinforcing portion formed in the base layers of the gas diffusion layers are oriented in one direction.

7. The unit cell of claim 6, wherein the lands and the channels formed in the flow field type separators are formed to be aligned in one direction.

8. The unit cell of claim 7, wherein a direction in which the continuous carbon fibers of the reinforcing portion are oriented is kept at an angle of 45 to 90° with respect to the direction in which the lands and the channels of the flow field type separators are formed.

* * * * *